United States Patent [19]

Moran

[11] Patent Number: 4,868,233

[45] Date of Patent: Sep. 19, 1989

[54] POLYETHYLENE MODIFIED ASPHALTS

[75] Inventor: Lyle E. Moran, Sarnia, Canada

[73] Assignee: Exxon Research and Engineering Company, Florham Park, N.J.

[21] Appl. No.: 73,813

[22] Filed: Jul. 15, 1987

[51] Int. Cl.$^4$ .................. C08L 23/04; C08L 95/00
[52] U.S. Cl. ................................. 524/71; 524/59; 524/62; 524/64
[58] Field of Search .................. 524/59, 64, 70, 71, 524/62

[56] References Cited

U.S. PATENT DOCUMENTS 4,314,921  2/1982  Biegenzein ........................ 524/59
4,328,147  5/1982  Chang et al. ...................... 524/59

FOREIGN PATENT DOCUMENTS 0130367  1/1985  European Pat. Off. .
0064630  9/1985  European Pat. Off. .

OTHER PUBLICATIONS

Jew et al., Journal of Applied Polymer Science, 31, pp. 2685–2704 (1986).
Transportation and Road Research Laboratory Report 1101 by Denning, J. H. et al, Highways and Structures Department, Crowthorne, Berkshire, England (1983).

*Primary Examiner*—Allan M. Lieberman
*Attorney, Agent, or Firm*—John W. Ditsler

[57] ABSTRACT

The present invention relates to an improved polyethylene modified asphaltic composition and a method for its manufacture. More specifically, when certain linear polyethylene compounds are added to an asphalt that is low in asphaltenes but relatively high in saturates, there results a composition which has excellent storage stability, phase compatibility and creep resistance relative to unmodified asphalts. The improved asphaltic composition is particularly well suited for use as a binder in paving materials and as a coating or saturant for roofing products.

33 Claims, 4 Drawing Sheets

POLYETHYLENE MODIFIED ASPHALTS

BACKGROUND OF THE INVENTION

1. Field of the Invention

The present invention relates to an improved polyethylene modified asphaltic composition and its method of preparation.

2. Discussion of Related Art

Asphalt is a bituminous material resulting from the distillation of crude oil. Typically, asphalt is derived from the bottoms of a vacuum distillation tower and has an atmospheric boiling point of at least 400° C. Because it is hydrophobic and has good adhesiveness and weatherability, asphalt has been used widely as a binder in paving materials and as a coating for roofing shingles.

When used in roofing applications (e.g. a shingle coating or a saturant), the asphalt is usually polymerized by undergoing oxidative dehydrogenation in which the asphalt is contacted with an oxygen-containing gas (usually air) at temperatures ranging between about 200° C. and about 300° C. for between about 6 and about 24 hours. This procedure is described in detail by L. W. Corbett in Bituminous Materials: Asphalts, Tars and Pitches, Interscience Publishers, New York (1965) and by E. J. Barth in Asphalt Science and Technology, Gordon and Breach Science Publishers, New York (1968), the disclosures of each being incorporated herein by reference. Oxidative dehydrogenation improves the creep (i.e. flow) resistance and weatherability of the asphalt, and reduces its sensitivity to temperature changes.

When used as a conventional paving binder, the asphalt does not usually undergo oxidative dehydrogenation, but rather, is manufactured to meet certain control specifications such as flash point (ASTM D-92), penetration at 25° C. (ASTM D-5), apparent viscosity at 60° C. (ASTM D-2171) and kinematic viscosity at 135° C. (ASTM D-2170). In addition to the control specifications, a paving asphalt should also meet certain performance specifications such as ductility (ASTM D-113), solubility in trichloroethylene (ASTM D-2042), and thin film oven aging (ASTM D-1754).

In the past, asphalts which met the above-mentioned control and performance specifications were generally considered more than adequate as paving binders. However, more recently, asphalt users have been demanding higher performance products. For example, today's increased heavy truck traffic volume is stressing and destroying roads. One of the major problems resulting from this increased traffic loading is pavement rutting due to the natural tendency of asphalt to creep over a period of time, particularly during the increased temperatures of summer. Therefore, road construction contractors are now in serious need of paving asphalt binders which have an increased resistance to creep.

As a further example of the increasing demand for enhanced performance, low temperature cracking in roads and roofing products is still a major problem. Accordingly, a reduction of the temperature at which the product will crack (typically below about 0° C.) would provide an additional benefit throughout the construction industry. A formulation with improved low temperature cracking properties would have higher tensile strength to resist the accumulated tensile stresses and reasonably similar or lower stiffness to minimize brittleness and fracture.

One approach for changing or adjusting the rheological and chemical properties of asphalt is to incorporate certain additives therein. For example, a polymer such as polyethylene has been added to asphalt to produce asphalts which exhibit an increased resistance to creep or deformation. In addition, polyethylene modified asphalts must also have good compatibility between the asphalts and polyethylene, and be stable at high temperatures during storage and asphalt plant operation for ease of handling and application. Compatibility between the polyethylene and asphalt is very important to ensure that the engineering properties of both the asphalt and polyethylene are transferred to the finished product and to provide good long term performance. However, most polyethylene modified asphalts require either continuous mixing or the addition of various additives to avoid phase incompatibility (See for example U.S. Pat. Nos. 4,240,946 and 4,314,921 which require continuous high shear mixing to obtain physical dispersion of a polyolefin in bitumen, and Jew et al., Journal of Applied Polymer Science, 31, pp. 2685-2704 (1986) which discloses the addition of one or more dispersants to a polyethylene modified asphalt to avoid phase separation, the disclosures of each being incorporated herein by reference. See also Transportation and Road Research Laboratory Report 1101 by Denning, J. H. et al., Highways and Structures Department, Crowthorne, Berkshire, England (1983)).

Polyethylene has also been added to asphalt containing blends for other purposes. For example, European Patent Application 130,367 discloses thermoplastic moulding compounds which contain an ethylene copolymer having a vinyl ester and/or an alkyl ester, bitumen, carbon black, glyceryl monostearate, filler material and a second ethylene copolymer which is described as a linear low density polyethylene having a melt index from 0.1-10 g/10 mins. and a density between 0.918-0.935 g/cm$^3$. The combination of the two ethylene copolymers with bitumen forms a bituminous moulding compound having high strength at room temperature, high dimensional stability under heat and rigidity. As another example, European Patent Application 64,630 discloses a flame retardant halogen-free thermoplastic moulding composition which contains ethylene copolymer, bitumen, aluminum hydroxide, red phosphorus, carbon black, glyceryl monostearate and, if necessary, polyethylene having a melt index of 0.1-10 g/10 min. and a density from 0.917 to 0.940 g/cm$^3$. The dimensional stability of the mixture under heat is increased due to the polyethylene addition. Both patentees disclose that the moulding compounds formed are suitable for the preparation of moulded articles, particularly sealing widths for structural and civil engineering applications. In addition, both patentees use asphalt as a diluent rather than as a major component of the product.

Accordingly, none of the foregoing references teach or suggest a polyethylene modified asphalt composition (and a method for making same) which does not require continuous mixing or addition of dispersants or other compounds to maintain phase compatibility of said composition.

SUMMARY OF THE INVENTION

Now according to the present invention, it has been discovered that an asphaltic composition having improved phase stability and rheological properties can be produced by adding selected polyethylene compounds to certain asphalts. The expression, "polyethylene compounds", is intended to encompass all linear polymers of ethylene of the type disclosed in the remainder of the specification. More specifically, an asphaltic composition having enhanced storage stability, phase compatibility and creep resistance relative to conventional asphalts (i.e. straight-run asphalts obtained as residua from vacuum distillation of crude oil) is formed when linear polyethylene compounds are added to an asphalt having a weight ratio of saturates to asphaltenes greater than about 5.5. The resulting composition also has a higher tensile strength with relatively low stiffness at low temperatures compared to conventional asphalts and is particularly well suited for use as a paving binder and a coating or saturant for roofing products.

DETAILED DESCRIPTION OF THE INVENTION

Figure 1:
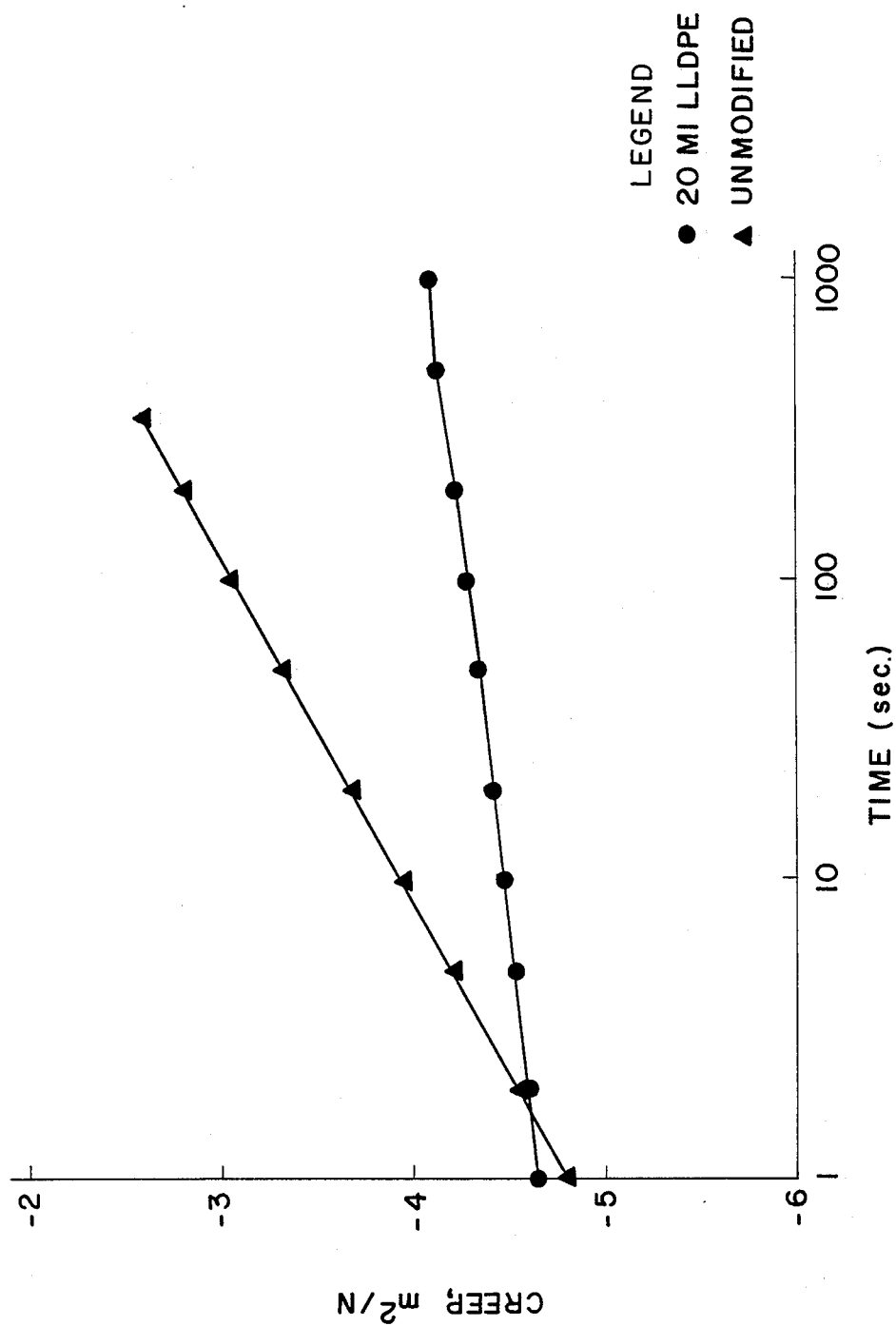
FIGS. 1-4 are graphs showing the creep resistance of various asphalt compositions versus time.

In the present invention, an improved asphaltic composition is formed by the addition of at least one linear polyethylene compound to certain asphalts. The particular asphalt employed must be low in asphaltenes and relatively high in saturates to ensure satisfactory creep resistance, phase compatibility and storage stability of the polyethylene modified product. Storage stability is the more critical criteria to satisfy. Accordingly, the weight ratio of saturates to asphaltenes in the asphalt must be above about 5.5 (preferably above 5.7 and more preferably at least about 6) to avoid storage stability problems of the polyethylene modified product. The upper limit on the saturates/asphaltenes weight ratio is not critical and will vary depending on the particular application of the product formed. However, the ratio should be below that at which phase separation or loss of rheological properties will occur. Typically, the weight ratio should be below about 9. For paving binders and roofing applications, the weight ratio should preferably be between about 5.5 (preferably about 5.7) and about 8, more preferably between about 5.5 (preferably above 5.7) and about 7, as products resulting from using greater ratios would be too soft for such applications. The saturates/asphaltenes weight ratio of the particular asphalt employed may be adjusted to the desired level by adding one or more feedstocks rich in saturates; e.g. a paraffin lube distillate.

The asphalt used in the present invention may be obtained from a variety of sources including straight-run vacuum residue; mixtures of vacuum residue with diluents such as vacuum tower wash oil, paraffin distillate, aromatic and naphthenic oils and mixtures thereof; oxidized vacuum residues or oxidized mixtures of vacuum residues and diluent oils and the like. Other asphaltic materials such as coal tar pitch, rock asphalt and naturally occurring asphalt may also be used. Typically, the asphalt will have an atmospheric boiling point of at least 380° C., more typically at least 440° C., and will comprise a major amount or portion of the asphaltic composition. In paving binder applications, the asphalt will typically comprise 85, preferably 90, wt.% or more of the resulting product. The asphalt will typically comprise 80, preferably 85, wt.% or more for roofing products.

The particular polyethylene compounds added must be linear polyethylenes; i.e., polyethylene compounds which are formed in the presence of a catalyst and which have minimal branching of carbon chains having more than ten carbon atoms. Branched polyethylenes cannot be suitably employed in the present invention as they will not result in the formation of a product having improved rheological and thermal properties. Linear polyethylenes which may be used in the present invention are high density, low density and very low density linear polyethylene compounds which may be characterized as follows:

| Linear Polyethylene | Density, g/cm$^3$ |
| --- | --- |
| High Density | Above 0.940 |
| Low Density | 0.915-0.940 |
| Very Low Density | Below 0.915 |

The minimum melt index of the particular linear polyethylene compound employed may vary broadly depending upon the saturates/asphaltenes weight ratio of the asphalt. More specifically, as the melt index of the polyethylene compound decreases, the saturates/asphaltenes weight ratio of the asphalt must be increased to maintain storage stability of the blended product. The melt index of the particular polyethylene compound employed will also vary depending upon the specific use of the asphaltic composition formed. In addition, practical considerations such as the amount of saturates rich feedstock available often dictate the melt index used. For typical paving applications, the minimum melt index should be at least about 6.7 for linear high density polyethylene (LHDPE) compounds, above 8 for linear low density polyethylene (LLDPE) compounds and at least about 3 for linear very low density polyethylene (LVLDPE) compounds. Similarly, there is essentially no upper limit on the melt index of the particular linear polyethylene compound employed because as melt index increases, the molecular weight of the polyethylene compound decreases, and there is less tendency for lower molecular weight compounds to cause phase separation due to asphaltene precipitation. The linear polyethylene compounds used can be in any convenient form (e.g. granular, pelletized, etc.) or shape, including irregularly shaped materials (e.g. reclaimed materials).

A minimum of about 4 wt.% of the linear polyethylene compound must be added to the asphalt to obtain a modified asphalt blend which has creep resistance. The upper limit on the amount of linear polyethylene compound added is not critical and can range up to 25 wt.% or more based on weight of the asphalt, although lower amounts are preferred. Accordingly, the amount of linear polyethylene added will typically range from about 4 to about 25 wt.%, preferably from about 4 to about 15 wt.% and more preferably from about 4 to about 10 wt.%, based on weight of the asphalt. When used as a paving binder, the polyethylene modified asphalt of the present invention preferably contains from about 4 to about 8 wt.% linear polyethylene. When used for roofing applications, the polyethylene modified asphalt preferably contains from about 5 to about 15 wt.% linear polyethylenes.

The particular linear polyethylene compounds employed in the present invention may be readily obtained in the marketplace from various chemical suppliers. Their method of preparation is well known to one skilled in the art and is described in Kirk-Othmer, Encyclopedia of Chemical Technology, 3rd Edition, 16, pp. 385–401, John Wiley & Sons, New York (1981) and "VLDPE—A New Class of Polyethylene", Plastics and Rubber International, 11, No. 2, pp. 34–33 (1986), the disclosures of which are incorporated herein by reference.

The asphalt may be mixed or blended with the linear polyethylene compounds in any number of ways which can readily be selected by one skilled in the art. Suitable means include external mixers, roll mills, internal mixers, Banbury mixers, screw extruders, augers and the like. Blending times can range broadly; i.e. from about 1 hour to about 8 hours or more. Typically, blending times of about 1 to about 4 hours will be employed.

Similarly, the particular conditions at which the asphalt is blended with the linear polyethylene compounds are not critical. Typically, the blending will be performed at ambient pressure and at a temperature between about 150° and about 300° C., preferably between about 150° and about 230° C.

The improved asphaltic composition of the present invention may be suitably employed in essentially any application requiring asphalt-based products with superior storage stability, phase compatibility and creep resistance. Examples of such applications include adhesives, coatings, fabricated products, road and roofing applications, sealants, sound and vibration dampening, water proofing membranes and the like. The composition, however, is particularly well suited for use as a paving binder and for roofing asphalt formulations.

The present invention will be further understood by reference to the following Examples which are not intended to restrict the scope of the claims appended hereto. In the Examples, the storage stability, phase compatibility and creep resistance of the asphalts tested were measured as follows:

STORAGE STABILITY

A 200 gram sample is placed in a copper tube (10 inches high and 1 inch in diameter) and heated at 160° C. for 5 days. Then the sample is removed from the tube and divided into top and bottom fractions. The viscosity of each fraction is measured at 135° C. The ratio of the top over the bottom viscosity at 135° C. is then calculated. A ratio of 0.90 to 1.1 is preferred; 0.8–0.9 and 1.1–1.2 is borderline; and less than 0.8 or more than 1.2 is a failure.

PHASE COMPATIBILITY

A thin film of the sample is spread on a microscope side and heated at 100° C. for 4 hours. Slides containing the heated and unheated sample are then examined under an optical microscope at 260 power. If there is no change in surface morphology, the blend is compatible. If phase separation is noted or a significant change occurs in surface morphology, then the blend is incompatible.

CREEP RESISTANCE

The sliding plate rheometer is used to measure the creep resistance and shear of the asphalts tested over a continuous range of loading times following the procedure set forth by Fenijn and Krooshof in "Proceedings of CTAA", Winnipeg, Canada, November 1970, the disclosure of which is incorporated herein by reference. In the Examples, data was obtained at 40° C. (and at 20° C. as well in Examples 1 and 2) since asphalt pavement will be prone to rutting under heavy loads at this temperature. From these data, creep resistance was plotted against time to show the creep behavior of the composition with time. If the composition creeps or flows with time, the curve will slope upwards. If the composition has good flow resistance, the curve will tend to become horizontal and flatten or plateau.

EXAMPLE 1

Preparation of Asphalt Blends

The compositions of various asphalt blends were calculated mathematically using an unmodified or conventional asphalt (i.e. a straight-run asphalt obtained as a residue from the vacuum distillation of crude oil which has not been modified by polyethylene addition) and a paraffin lube distillate (PLD) having the following compositions as measured by ASTM D-4124:

| Composition, wt. % | Asphalt | PLD |
| --- | --- | --- |
| Asphaltenes | 3.8 | 0.0 |
| Polar Aromatics | 39.7 | 12.8 |
| Naphthene Aromatics | 39.8 | 35.7 |
| Saturates | 16.7 | 51.5 |

The compositions of the particular asphalts blended are shown in Table 1. The blended compositions were not measured using ASTM D-4124 because the test is not sufficiently precise to determine each fraction of the blend. Consequently, blends with different compositions can result in saturates/asphaltenes weight ratios which overlap. The mathematical calculation of the saturates/asphaltenes weight ratios provides a practical guideline by which asphalts of differing saturates/asphaltenes weight ratios can be differentiated.

TABLE 1

| | Blend Number | | | | |
| --- | --- | --- | --- | --- | --- |
| | 1 | 2 | 3 | 4 | 5 |
| Asphalt, wt. % | 100 | 92 | 88 | 83 | 75 |
| Paraffin Lube Distillate, wt. % | 0 | 8 | 12 | 17 | 25 |
| Asphalt + PLD Composition, wt. % | | | | | |
| Asphaltenes | 3.8 | 3.5 | 3.3 | 3.2 | 2.9 |
| Polar Aromatics | 39.7 | 37.5 | 36.5 | 35.1 | 33.0 |
| Naphthene Aromatics | 39.8 | 39.5 | 39.3 | 39.1 | 38.8 |
| Saturates | 16.7 | 19.5 | 20.9 | 22.6 | 25.3 |
| Saturates/Asphaltenes Weight Ratio | 4.4 | 5.6 | 6.3 | 7.1 | 8.7 |

EXAMPLE 2

LLDPE Modified Asphalt is Superior to Unmodified Asphalt 25.5 grams of linear low density polyethylene having a 20 melt index (M.I.) were blended with 485.2 grams of 435 cSt/100° C. asphalt containing 82.4 grams of paraffinic lube distillate. The final concentration of the LLDPE in the modified asphalt was 5.0%. The blending operation was performed at 190° C. for two hours in a baffled autoclave equipped with a stirrer rotating at 1750 rpm. Properties of the LLDPE modified paving binder were determined as were the corresponding properties of a unmodified asphalt paving binder. The results are summarized in Table 2 and shown in FIG. 1.

TABLE 2

|  | Unmodified | Polyethylene Modified |
|---|---|---|
| Feed Inspections | | |
| Polyethylene | — | Linear Low Density |
| Wt. % | — | 5 |
| Melt Index, g/10 min. | — | 20 |
| Density, g/cm³ | — | 0.924 |
| Asphalt, wt. % | 100 | 83 |
| Paraffin Lube Distillate, wt. % | — | 17 |
| Asphalt + PLD Composition, wt. % | | |
| Blend Number from Table 1 | ASTM D-4124 | 4 |
| Asphaltenes | 3.8 | 3.2 |
| Polar Aromatics | 39.7 | 35.1 |
| Naphthenes and Aromatics | 39.8 | 39.1 |
| Saturates | 16.7 | 22.6 |
| Saturates/Asphaltenes Weight Ratio | 1.2 | 7.1 |
| Product Inspections | | |
| Softening Point, °C. | 40 | 108 |
| Penetration at 25° C. | 142 | 167 |
| Viscosity at 60° C., Pa.S | 44 | 2195 |
| 135°C., cSt | 194 | 433 |
| Storage Stability | 1.00 | 1.05 |
| Phase Compatibility | Yes | Yes |
| Creep Resistance at 40° C. (See FIG. 1) | Poor at 20° C.[1] | Excellent |

[1] Test performed at 20° C. because sample too soft to measure at 40° C.

Table 2 shows that the linear low density polyethylene modified asphalt has superior creep resistance relative to an unmodified asphalt (also see FIG. 1) as well as comparable storage stability and phase compatibility. Table 2 also shows that the viscosity at 60° C. increases significantly compared to the unmodified asphalt, whereas the viscosity at 135° C. is not increased significantly relative to that of the unmodified asphalt.

EXAMPLE 3

LLDPE Modified Asphalt Is Superior to Low Density Polyethylene Modified Asphalt

A linear low density polyethylene modified product was prepared by blending 42.0 grams of linear low density polyethylene having a 12 melt index with 797.6 grams of 435 cSt/100° C. asphalt which contained 82.4 grams of paraffinic lube distillate.

A branched low density polyethylene modified product was prepared by blending 28.6 grams of low density polyethylene having a 12 melt index with 544.0 grams of a 435 cSt/100° C. asphalt which contained 82.4 grams of paraffinic lube distillate.

Each blend was prepared in the same manner at 190° C. for two hours in a baffled autoclave equipped with a stirrer rotating at 1750 rpm, and had a final polyethylene concentration of 5%.

Figure 2:
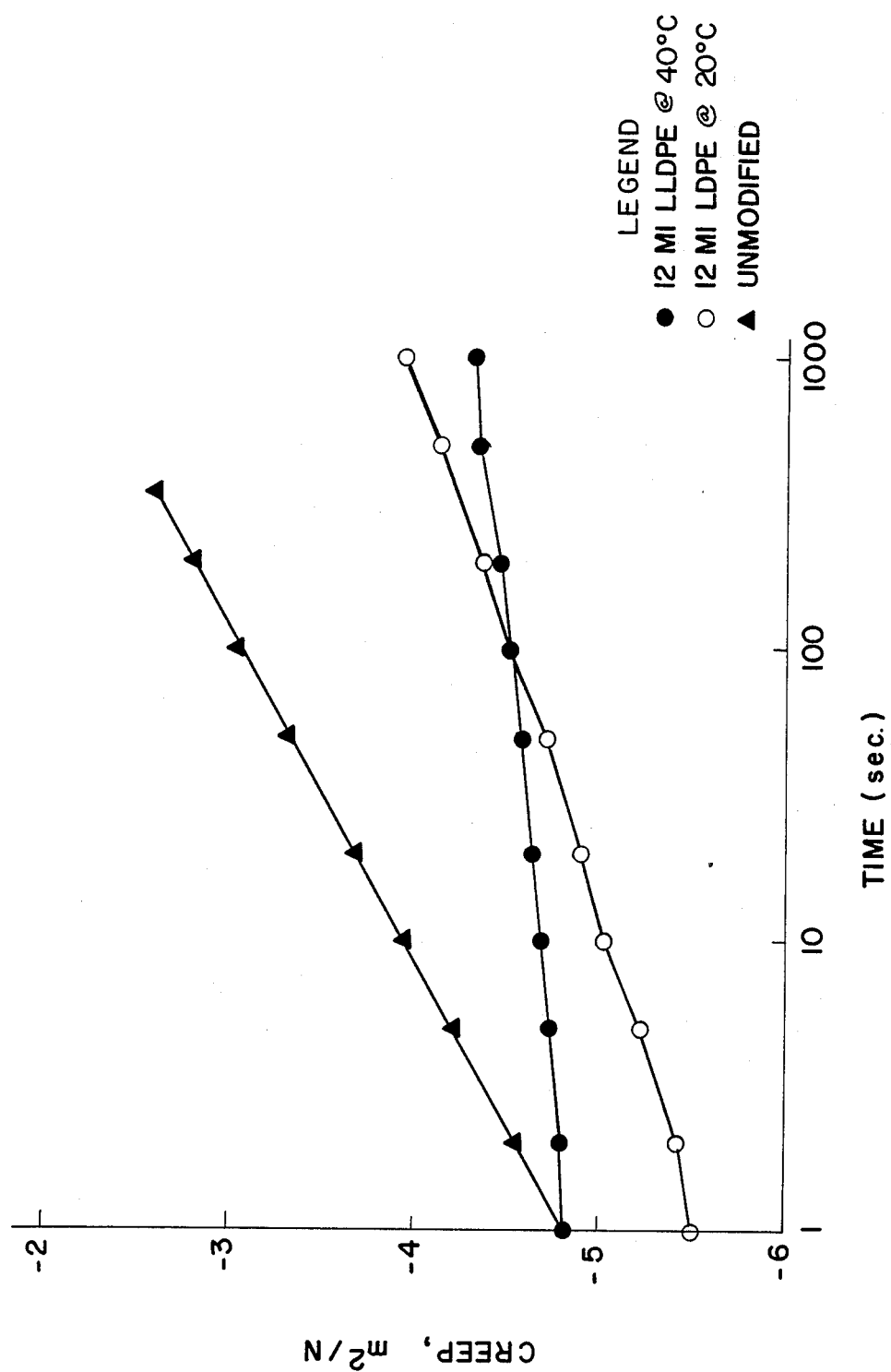

The properties of the products measured are summarized in Table 3, with the creep for each product being shown in FIG. 2 along with that of the unmodified asphalt from Example 2.

TABLE 3

|  | Linear Low Density | Branched Low Density |
|---|---|---|
| Feed Inspections | | |
| Polyethylene | | |
| Wt. % | 5 | 5 |
| Melt Index, g/10 mins. | 12 | 12 |
| Density, g/cm³ | 0.923 | 0.917 |
| Asphalt Composition | Same as LLDPE Asphalt of Example 2. | |
| Product Inspections | | |
| Softening Point, °C. | 109 | 106 |
| Penetration at 25° C. | 155 | 186 |
| Viscosity at 60° C., Pa.S | 3542 | 311 |
| 135° C., cSt | 513 | 337 |
| Storage Stability | 1.01 | 1.02 |
| Phase Compatibility | Yes | No |
| Creep Resistance at 40° C. | Excellent (See FIG. 2) | Poor at 20° C.[1] |

[1] Test performed at 20° C. because sample too soft to measure at 40° C.

The results in Table 3 show that the linear low density polyethylene product had excellent creep resistance, phase compatibility and high temperature storage stability. Although the low density polyethylene modified asphalt had good storage stability, it had poor creep resistance and poor phase compatibility.

EXAMPLE 4

Determination of Minimum Melt Index of LLDPE at the Same Saturates/Asphaltenes Weight Ratio

Figure 3:
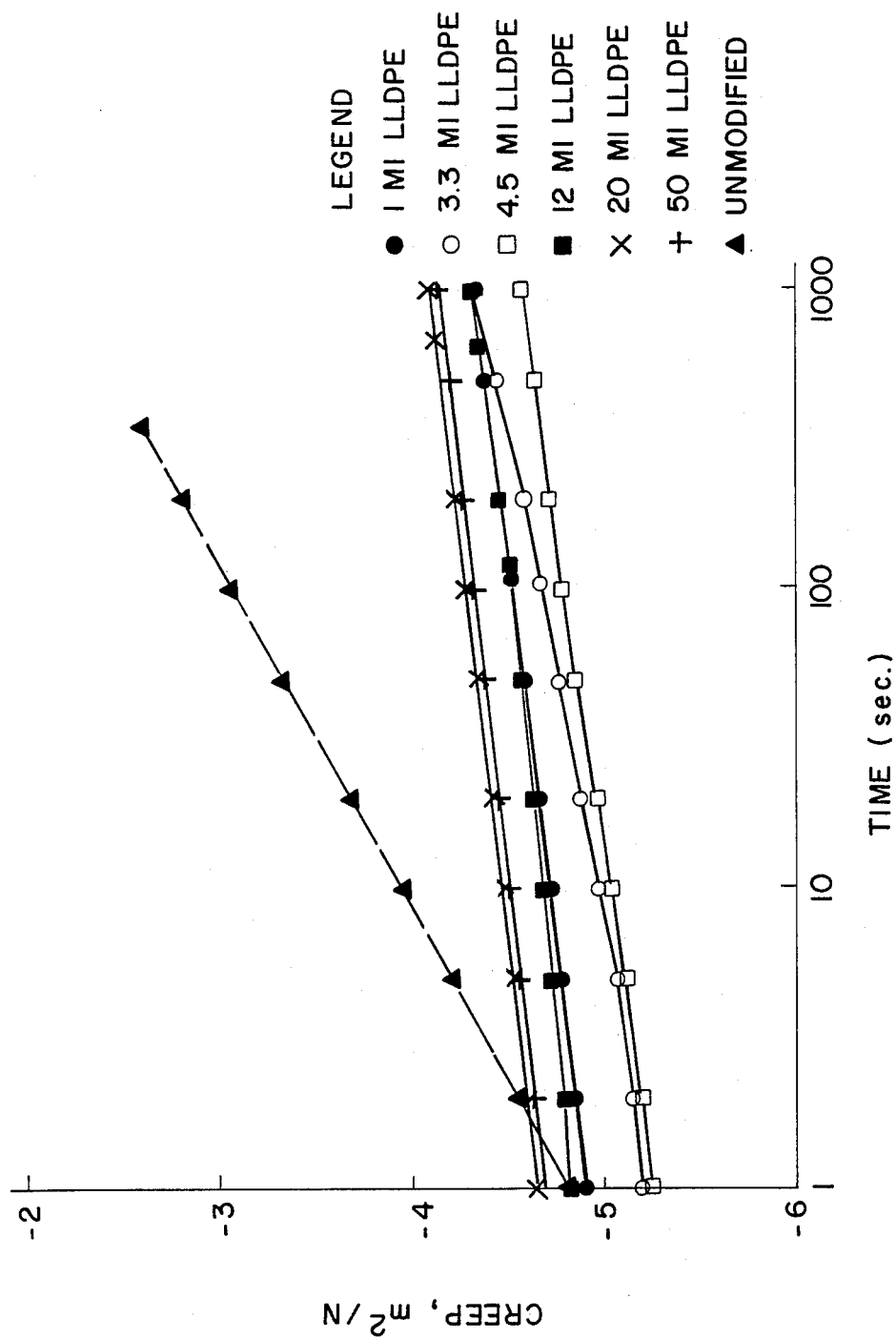

Blends of 1, 3.3, 4.5, 20 and 50 melt index linear low density polyethylene modified asphalts having a saturates/asphaltenes weight ratio of 7.1 were prepared using the same feedstock and blending conditions as in Example 2. The properties of the products measured are summarized in Table 4, with the creep for each product being shown in FIG. 3 along with that of the unmodified asphalt from Example 2.

TABLE 4

| Feed Inspections | | | | | |
|---|---|---|---|---|---|
| Polyethylene | Linear Low Density | | | | |
| Wt. % | 5 | 5 | 5 | 5 | 5 |
| Melt Index, g/10 mins. | 1 | 3.3 | 4.5 | 20 | 50 |
| Density, g/cm³ | 0.918 | 0.939 | 0.932 | 0.924 | 0.926 |
| Asphalt Composition | Same as LLDPE Asphalt of Example 2 | | | | |
| Product Inspections | | | | | |
| Softening Point, °C. | 113 | 118 | 116 | 108 | 92 |
| Penetration at 25° C. | 83 | 120 | 126 | 167 | 191 |
| Viscosity at 60° C., Pa.S | (1) | (1) | (1) | 2195 | 2844 |
| 135° C., cSt | 1890 | 1081 | 794 | 433 | 320 |
| Storage Stability | 2.4 | 1.3 | 1.2 | 1.05 | 0.99 |
| Phase Compatibility | Borderline | Yes | Yes | Yes | Yes |
| Creep Resistance at 40° C. (See FIG. 3) | | | Excellent | | |

(1) Too high to measure

The results in Table 4 show linear low density polyethylenes having a melt index below 4.5 do not form blends with acceptable storage stability at the same saturates/asphaltenes weight ratio.

EXAMPLE 5

Variation of LVLDPE Melt Index with Saturates/Asphaltenes Weight Ratio

Blends of 1, 2 and 3.3 melt index linear very low density polyethylene modified asphalts were prepared using the same blending conditions as in Example 2. The feedstocks were prepared to give saturates/asphaltenes weight ratios of 5.6, 6.3, 7.1 and 8.7 as described and shown in Example 1. The properties of the products measured are summarized in Table 5.

TABLE 5

| Feed Inspections | | | | | | |
|---|---|---|---|---|---|---|
| Polyethylene | Linear Very Low Density | | | | | |
| Wt. % | 5 | 5 | 5 | 5 | 5 | 5 |
| Melt Index, g/10 mins. | 3.3 | 3.3 | 3.3 | 2 | 1 | 1 |
| Density, g/cm³ | 0.912 | 0.912 | 0.912 | 0.912 | 0.912 | 0.912 |

TABLE 5-continued

| Asphalt Composition Blend Number from Table 1 | 4 | 3 | 2 | 4 | 4 | 5 |
|---|---|---|---|---|---|---|
| Saturates/Asphaltenes Weight Ratio | 7.1 | 6.3 | 5.6 | 7.1 | 7.1 | 8.7 |
| Product Inspections | | | | | | |
| Softening Point, °C. | 109 | 109 | 118 | 110 | 109 | 116 |
| Penetration at 25° C. | 102 | 88 | 90 | 96 | 81 | 230 |
| Viscosity at 60° C., Pa.S | (1) | (1) | (1) | (1) | (1) | 9000 |
| 135° C., cSt | 1058 | 855 | 464 | 1400 | 1539 | 283 |
| Storage Stability | 1.0 | 1.0 | 1.0 | 1.1 | 1.2 | 1.0 |

(1) Too high to measure

The results in Table 5 show that as the melt index of linear very low density polyethylene decreases below about 3, the saturates/asphaltenes weight ratio must increase for the blends to have acceptable storage stability.

EXAMPLE 6

Variation of LLDPE Melt Index with Saturates/Asphaltenes Weight Ratio

Blends of 1, 3.3, 4.5 and 8 melt index linear low density polyethylene modified asphalts were prepared using the same blending conditions as in Example 2. The feedstocks were prepared to give saturates/asphaltenes weight ratios of 8.7, 7.1, 6.3 and 5.6 as described and shown in Example 1. The properties of the products measured are summarized in Table 6.

TABLE 6

| Feed Inspections | | | | | | |
|---|---|---|---|---|---|---|
| Polyethylene | Linear Low Density | | | | | |
| Wt. % | 5 | 5 | 5 | 5 | 5 | 5 |
| Melt Index, g/10 mins. | 8 | 8 | 4.5 | 4.5 | 3.3 | 1 |
| Density, g/cm$^3$ | 0.928 | 0.928 | 0.932 | 0.932 | 0.939 | 0.918 |
| Asphalt Composition Blend Number from Table 1 | 2 | 3 | 4 | 5 | 5 | 5 |
| Saturates/Asphaltenes Weight Ratio | 5.6 | 6.3 | 7.1 | 8.7 | 8.7 | 8.7 |
| Product Inspections | | | | | | |
| Softening Point, °C. | 113 | 106 | 116 | 113 | 116 | 110 |
| Penetration at 25° C. | 81 | 105 | 126 | 213 | 186 | 118 |
| Viscosity at 60° C., Pa.S | (1) | (1) | (1) | (1) | (1) | (1) |
| 135° C., cSt | 724 | 648 | 794 | 693 | 965 | 2289 |
| Storage Stability | 1.7 | 1.0 | 1.2 | 1.0 | 1.0 | 1.1 |
| Phase Compatibility | (2) | Yes | Yes | (2) | (2) | (2) |

(1) Too high to measure
(2) Data not available

The results in Table 6 show that as the melt index of linear low density polyethylene decreases below about 8 (progressing from 4.5, 3.3 to 1), the saturates/asphaltenes weight ratio must increase for the blends to have acceptable storage stability.

EXAMPLE 7

Variation of LHDPE Melt Index with Saturates/Asphaltenes Weight Ratio

Blends of 6.7, 15 and 19 melt index linear high density polyethylene modified asphalts were prepared using the same blending conditions as in Example 2. The feedstocks were prepared to give saturates/asphaltenes weight ratios of 5.6, 6.3, 7.1 and 8.7 as described and shown in Example 1. The properties of the products measured are summarized in Table 7.

TABLE 7

| Feed Inspections | | | | | | |
|---|---|---|---|---|---|---|
| Polyethylene | Linear Low Density | | | | | |
| Wt. % | 5 | 5 | 5 | 5 | 5 | 5 |
| Melt Index, g/10 mins. | 19 | 15 | 15 | 6.7 | 6.7 | 6.7 |
| Density, g/cm$^3$ | 0.952 | 0.952 | 0.952 | 0.951 | 0.951 | 0.951 |
| Asphalt Composition Blend Number from Table 1 | 4 | 3 | 2 | 5 | 4 | 3 |
| Saturates/Asphaltenes Weight Ratio | 7.1 | 6.3 | 5.6 | 8.7 | 7.1 | 6.3 |
| Product Inspections | | | | | | |
| Softening Point, °C. | 118 | 118 | 118 | 119 | 116 | 116 |
| Penetration at 25° C. | 130 | 110 | 80 | 275 | 155 | 107 |
| Viscosity at 60° C., Pa.S | (1) | (1) | (1) | (1) | (1) | (1) |
| 135° C., cSt | 500 | 512 | 578 | 270 | 345 | 461 |
| Storage Stability | 1.1 | 0.96 | 1.03 | 1.0 | 1.0 | 1.0 |
| Phase Compatibility | Yes | (2) | (2) | (2) | (2) | (2) |
| Creep Resistance at 40° C. | Excellent | (2) | (2) | (2) | (2) | (2) |

(1) Too soft to measure
(2) Data not available

The results in Table 7 show that as the melt index of linear high density polyethylene decreases, the saturates/asphaltenes weight ratio must be increased to obtain acceptable storage stability.

EXAMPLE 8

Minimum Melt Index Varies with Density of Linear Polyethylene at the Same Saturates/Asphaltenes Weight Ratio Various linear polyethylene modified asphalts having a saturates/asphaltenes weight ratio of 7.1 were prepared using the same feedstock and blending conditions as in Example 2, except that linear polyethylenes of varying density and melt indexes were used. The product inspections measured are summarized in Table 8, with the creep of each product being shown in FIG. 4 along with that of the unmodified asphalt from Example 2.

TABLE 8

| Feed Inspections | | | | | |
|---|---|---|---|---|---|
| Polyethylene | Linear Very Low Density | | Linear Low Density | | Linear High Density |
| Wt. % | 5 | 5 | 5 | 5 | |
| Melt Index, g/10 mins. | 1 | 3.3 | 4.5 | 12 | 19 |
| Density, g/cm$^3$ | 0.912 | 0.912 | 0.932 | 0.932 | 0.952 |
| Asphalt Composition | Same as LLDPE Asphalt of Example 2 | | | | |
| Product Inspections | | | | | |
| Softening Point, °C. | 109 | 109 | 116 | 109 | 118 |
| Penetration at 25° C. | 81 | 102 | 126 | 155 | 130 |
| Viscosity at 60° C., Pa.S | (1) | (1) | (1) | 3542 | (1) |
| 135° C., cSt | 1539 | 1058 | 794 | 513 | 500 |
| Storage Stability | 1.2 | 1.0 | 1.2 | 1.0 | 1.1 |
| Phase Compatibility | Yes | Yes | Yes | Yes | Yes |
| Creep Resistance at 40° C. | | | Excellent | | |

Figure 4:
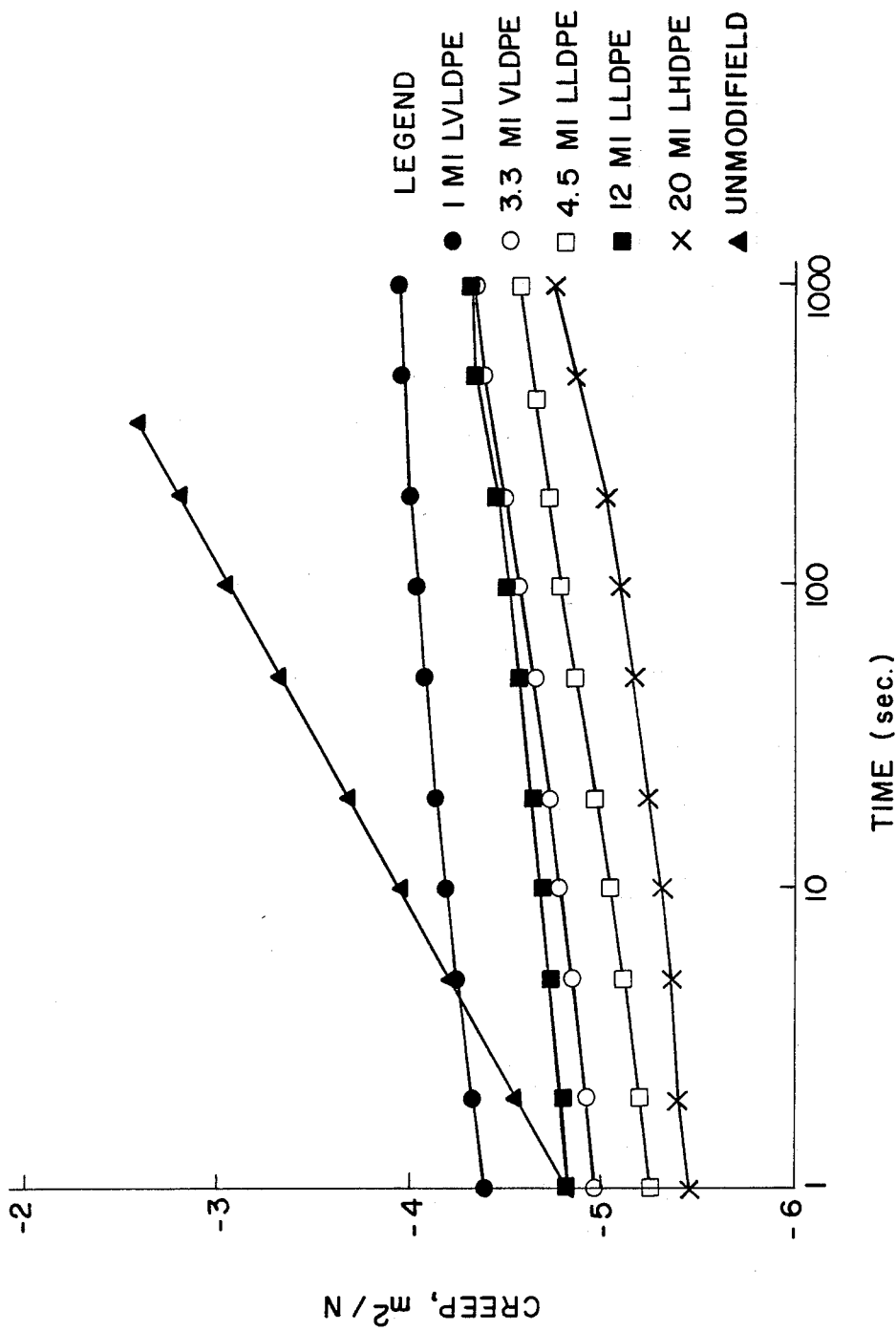

TABLE 8-continued (see FIG. 4)

(1) Too high to measure.

Example 8 demonstrates that for asphalts having the same saturates/asphaltenes weight ratio, as the density of linear polyethylene decreases, the minimum melt index which will give acceptble storage stability also decreases.

What is claimed is:

1. A storage stable and creep resistant asphalt composition which comprises
   (a) asphalt, and
   (b) at least about 4 wt.% of at least one linear polyethylene polymer,
wherein the weight ratio of the saturates to asphaltenes in said asphalt is above about 5.7 and below that at which phase separation of said composition will occur.

2. The composition of claim 1 wherein from about 4 to about 25 wt.% of said linear polyethylene polymer is present in said asphalt.

3. The composition of claim 1 wherein said linear polyethylene polymer is selected from the group consisting of linear very low density polyethylene polymers, linear low density polyethylene polymers, linear high density polyethylene polymers, and mixtures thereof.

4. The composition of claim 3 wherein said linear very low density polyethylene polymers have a melt index of at least about 3 g/10 mins., said linear low density polyethylene polymers have a melt index above 8 g/10 mins., said linear high density polyethylene polymers have a melt index of at least about 6.7 g/10 mins.

5. The composition of claim 1 wherein said asphalt comprises vacuum residua.

6. The composition of claim 1 wherein the weight ratio of saturates to asphaltenes in said asphalt ranges from about 5.7 to about 9.

7. The composition of claim 6 wherein said weight ratio ranges from about 5.7 to about 8.

8. The composition of claim 6 which contains from about 4 to about 15 wt% of said linear polyethylene polymer.

9. The composition of claim 8 which contains from about 4 to about 8 wt.% of said linear polyethylene polymer.

10. The composition of claim 1 wherein the weight ratio of saturates to asphaltenes in said asphalt is at least about 6 but below that at which phase separation of said composition will occur.

11. The composition of claim 2 wherein the weight ratio of saturates to asphaltenes in said asphalt ranges from about 5.7 to about 9.

12. The composition of claim 11 wherein the weight ratio of saturates to asphaltenes in said asphalt ranges from about 5.7 to about 8.

13. The composition of claim 11 wherein the said asphalt comprises a major amount of said composition.

14. An asphalt paving binder which comprises
   (a) at least 85 wt.% of an asphalt which has a weight ratio of saturates to asphaltenes ranging from about 5.7 to about 9, and
   (b) from about 4 to about 15 wt.% of at least one linear polyethylene polymer selected from the group consisting of linear very low density polyethylene polymers, linear low density polyethylene polymers, linear high density polyethylene polymers, and mixtures thereof.

15. The paving binder of claim 14 wherein from about 4 to about 10 wt.% of said linear polyethylene polymer is present therein.

16. The paving binder of claim 15 wherein the amount of linear polyethylene compound ranges from about 4 to about 8 wt.%.

17. The paving binder of claim 14 wherein said linear very low density polyethylene polymers have a melt index of at least about 3 g/10 mins., said linear low density polyethylene polymers have a melt index of above 8 g/10 mins., said linear high density polyethylene polymers have a melt index of at least about 6.7 g/10 mins.

18. The paving binder of claim 14 wherein the weight ratio of saturates to asphaltenes in said asphalt ranges from about 5.7 to about 8.

19. The paving binder of claim 16 wherein the weight ratio of saturates to asphaltenes in said asphalt ranges from about 5.7 to about 7.

20. The paving binder of claim 15 wherein said asphalt comprises vacuum residua.

21. In a process for improving the creep resistance and storage stability of an asphalt containing saturates and asphaltenes in which a polyethylene polymer is added to said asphalt, the improvement which comprises adding at least 4 wt.% of at least one linear polyethylene polymer to said asphalt provided the weight ratio of said saturates to asphaltenes therein is above about 5.7, to form a polyethylene modified asphalt which has enhanced creep resistance and storage stability relative to that obtained in the absence of adding a linear polyethylene polymer to said asphalt, wherein the weight ratio of the saturates to asphaltenes in said asphalt is above about 5.7 and below that at which phase separation of said polyethylene modified asphalt will occur.

22. The process of claim 21 wherein from about 4 to about 25 wt.% of said linear polyethylene polymer is added to said asphalt.

23. The process of claim 21 wherein said linear polyethylene polymer is selected from the group consisting of very low density polyethylene polymers, low density polyethylene polymers, high density polyethylene polymers, and mixtures thereof.

24. The process of claim 23 wherein said linear very low density polyethylene polymers have a melt index of at least about 3 g/10 mins., said linear low density polyethylene polymers have a melt index above 8 g/10 mins., said linear high density polyethylene polymers have a melt index of at least about 6.7 g/10 mins.

25. The process of claim 21 wherein said weight ratio ranges between about 5.7 and about 9.

26. The process of claim 25 wherein said weight ratio ranges between about 5.7 and about 8.

27. The process of claim 25 wherein from about 4 to about 15 wt% of said linear polyethylene polymer is added to said asphalt.

28. The process of claim 27 wherein from about 4 to about 8 wt.% of said linear polyethylene polymer is added to said asphalt.

29. The process of claim 21 wherein the weight ratio of saturates to asphaltenes in said asphalt is at least about 6 but below that at which phase separation of said composition will occur.

30. The process of claim 22 wherein the weight ratio of saturates to asphaltenes in said asphalt ranges from about 5.7 to about 9.

31. The process of claim 30 wherein the said asphalt comprises a major amount of said polyethylene modified asphalt.

32. The process of claim 21 wherein said asphalt comprises vacuum residua.

33. The process of claim 30 wherein the weight ratio of saturates to asphaltenes in said asphalt ranges from about 5.7 to about 8.

* * * * *